United States Patent
Haustein et al.

(10) Patent No.: US 9,704,442 B2
(45) Date of Patent: Jul. 11, 2017

(54) SYSTEM AND METHOD TO DISPLAY INFORMATION ON A HARD DISK DRIVE ASSEMBLY

(71) Applicant: INTERNATIONAL BUSINESS MACHINES CORPORATION, Armonk, NY (US)

(72) Inventors: Nils Haustein, Soergenioch (DE); Craig A. Klein, Austin, TX (US); Daniel J. Winarski, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 76 days.

(21) Appl. No.: 14/470,030

(22) Filed: Aug. 27, 2014

(65) Prior Publication Data
US 2014/0362061 A1 Dec. 11, 2014

Related U.S. Application Data

(63) Continuation of application No. 12/059,535, filed on Mar. 31, 2008, now Pat. No. 8,856,412.

(51) Int. Cl.
*G06F 3/00* (2006.01)
*G09G 3/36* (2006.01)
(Continued)

(52) U.S. Cl.
CPC .............. *G09G 3/36* (2013.01); *G09G 3/3208* (2013.01); *G11B 33/122* (2013.01)

(58) Field of Classification Search
None
See application file for complete search history.

(56) References Cited

U.S. PATENT DOCUMENTS

| 4,167,765 A | 9/1979 | Watrous |
| 4,503,471 A | 3/1985 | Hanajima et al. |

(Continued)

FOREIGN PATENT DOCUMENTS

| GB | 2305535 A | 4/1997 |
| JP | 59221881 | 12/1984 |

(Continued)

OTHER PUBLICATIONS

Haustein et al., System and Method to Display Information on a Data Storage Cartridge, Mar. 31, 2008, 32 pages, U.S. Appl. No. 12/059,545.

(Continued)

*Primary Examiner* — Henry Tsai
*Assistant Examiner* — Dean Phan
(74) *Attorney, Agent, or Firm* — Griffiths & Seaton PLLC

(57) ABSTRACT

Methods and systems are provided for displaying information on a hard disk drive assembly. One hard disk drive assembly includes a hard disk drive that includes a driver circuit coupled to a display and to a display memory. The driver circuit activates the display mounted on the hard disk drive assembly. In response to the activation of the display the driver circuit obtains information from the display memory of the hard disk drive. The driver circuit displays at least a portion of the information obtained from the display memory on the display mounted on the hard disk drive assembly.

20 Claims, 10 Drawing Sheets

(51) Int. Cl.
*G09G 3/3208* (2016.01)
*G11B 33/12* (2006.01)

(56) References Cited

U.S. PATENT DOCUMENTS

| | | | |
|---|---|---|---|
| 4,593,337 | A | 6/1986 | Leone |
| 4,688,131 | A | 8/1987 | Noda et al. |
| 5,604,662 | A | 2/1997 | Anderson et al. |
| 5,634,032 | A | 5/1997 | Haddock |
| 5,721,655 | A | 2/1998 | Thweatt |
| 5,745,102 | A | 4/1998 | Bloch et al. |
| 5,793,714 | A * | 8/1998 | Inoue et al. ............... 369/30.34 |
| 5,838,891 | A | 11/1998 | Mizuno et al. |
| 6,039,260 | A | 3/2000 | Eisele |
| 6,111,824 | A | 8/2000 | Benson |
| 6,144,549 | A | 11/2000 | Moss et al. |
| 6,385,004 | B1 | 5/2002 | Sanpei et al. |
| 6,476,725 | B2 | 11/2002 | Aguren et al. |
| 6,722,570 | B1 | 4/2004 | Eisele |
| 6,970,318 | B2 | 11/2005 | Goodman et al. |
| 7,289,859 | B2 | 10/2007 | Miwa et al. |
| 7,446,976 | B2 | 11/2008 | Sogabe |
| 7,599,176 | B1 | 10/2009 | Moisson |
| 7,668,576 | B2 | 2/2010 | Ellenbogen et al. |
| 2002/0101711 | A1 * | 8/2002 | Gold .................... G06F 3/0614 361/679.33 |
| 2003/0067702 | A1 | 4/2003 | Iles et al. |
| 2004/0012620 | A1 | 1/2004 | Buhler et al. |
| 2004/0052045 | A1 | 3/2004 | Botchek |
| 2004/0260470 | A1 | 12/2004 | Rast |
| 2005/0046989 | A1 | 3/2005 | Goodman |
| 2006/0095662 | A1 | 5/2006 | Arnott |
| 2007/0266323 | A1 * | 11/2007 | Dooley et al. ................ 715/719 |
| 2008/0178080 | A1 * | 7/2008 | Bumpus et al. .............. 715/700 |

FOREIGN PATENT DOCUMENTS

| | | |
|---|---|---|
| JP | 05073735 | 3/1993 |
| JP | 06260569 | 10/1994 |
| JP | 09259570 | 10/1997 |
| JP | 11219577 | 8/1999 |
| JP | 2002117597 | 4/2002 |
| WO | 0139115 A1 | 5/2001 |
| WO | 03081515 | 10/2003 |
| WO | 2006023230 | 3/2006 |

OTHER PUBLICATIONS

Winarski, "Patenting Bright Ideas—The Current State of Patented Technologies in the Field of Organic Light Emitting Diodes", 14 pages, Electronic and Photonic Magazine ISSN 8755-3996, vol. 20, No. 2, IEEE Circuits & Devices, Mar./Apr. 2004.

* cited by examiner

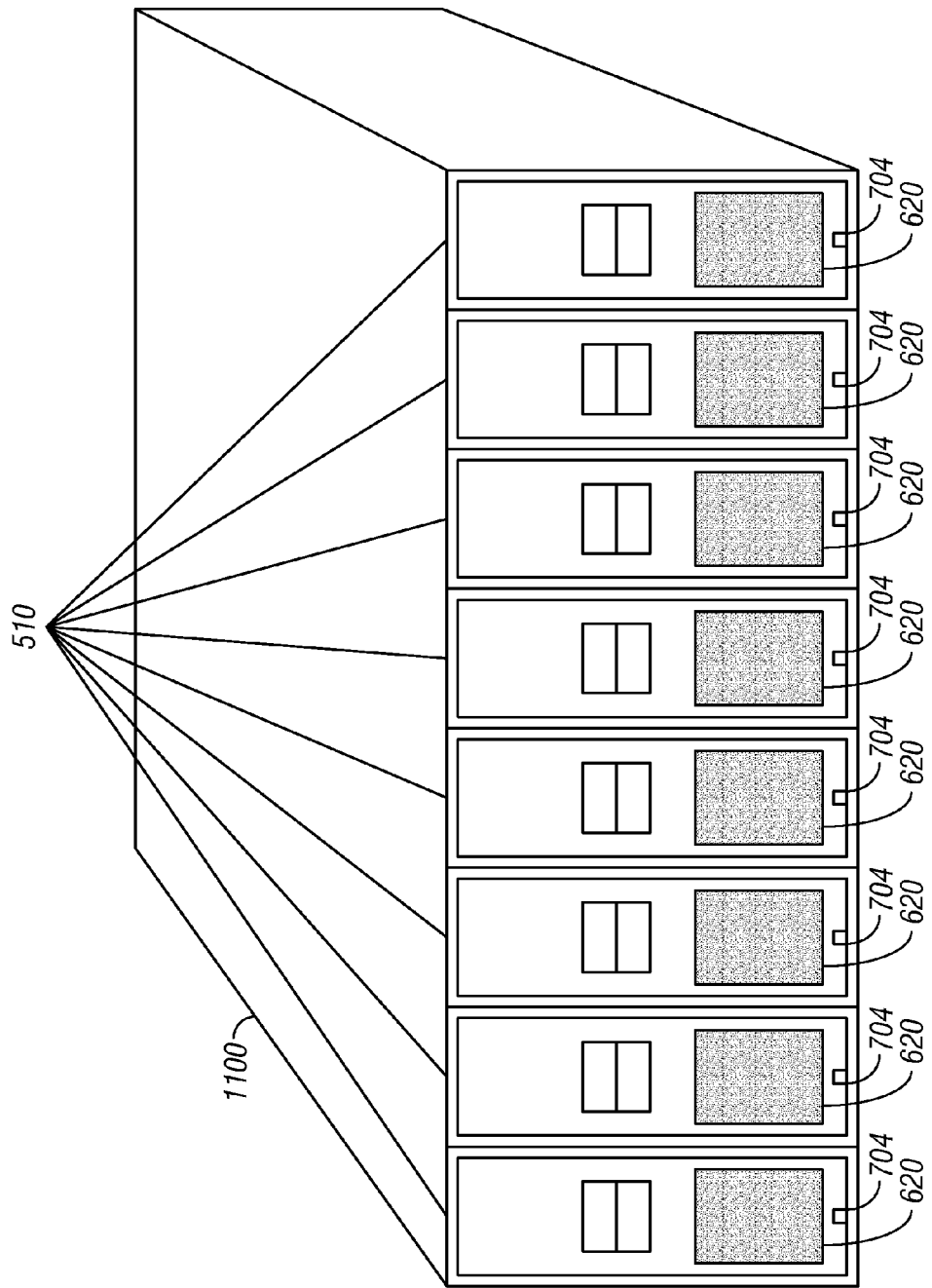

SYSTEM AND METHOD TO DISPLAY INFORMATION ON A HARD DISK DRIVE ASSEMBLY

REFERENCE TO RELATED APPLICATION

This application is a continuation of U.S. patent application Ser. No. 12/059,535, now U.S. Pat. No. 8,856,412, filed on Mar. 31, 2008, the contents of which are incorporated herein by reference in their entirety.

FIELD OF THE INVENTION

This invention relates to hard disk drives, and more particularly, a system and a method for displaying information related to a hard disk drive.

BACKGROUND OF THE INVENTION

Generally a data access and storage system consists of one or more storage devices that store data on magnetic or optical storage media. For example, a magnetic storage device is known as a direct access storage device (DASD) or a hard disk drive (HDD) and includes one or more hard disks. It is often desirable for the user to know information about a hard disk drive such as the content of data that is stored on the hard disk drive and the usage-context of the hard disk drive.

The data content of the hard disk drive may include data set names, a directory index or table, file names of the data files, an error history of the data stored on the hard disk drive, the application and/or format the data is stored in on the hard disk drive, hard disk manufacturing information, the volume serial number of the hard disk drive, the creator of the data, the date and/or time of the last write and/or read of the hard disk drive, the user name, system name, or application name of the last write and/or read of the hard disk drive In addition, to knowing the data content of a hard disk drive it is useful for the user to know the usage context of the hard disk drive. For example, it is helpful to know if the hard disk drive is used for cache (where high-end hard disk drives with fibre channel connectivity and high RPM or revolutions per minute are preferred since access time is critical) or as removable hard disk drive in a storage library (where low-end hard disk drives with low RPM are preferred as access time is not critical). Other examples of usage context of a hard disk drive may include information about whether the hard disk drive is the primary or backup device in a mirrored subsystem, the primary host system that uses the hard disk drive (in the case of a dedicated relationship), or the position of the particular hard disk drive in a hierarchal storage network. Finally, the usage-context may include information indicating that the hard disk drive is a write-once, read-many (WORM) device or that it is rewritable.

Hard disk drives may have labels affixed (i.e. adhesive paper or stickers) in an attempt to distinguish the hard disk drive or provide information regarding the data stored within the hard disk drive. The labels have a fixed capacity for information and allow only a limited amount of information about the hard disk drive and content and usage context of the hard disk drive. For example a label may include a hard disk drive identifier (e.g. a serial number). To obtain meaningful information regarding the hard disk drive, and the content of the hard disk drive the user must map the hard disk drive identifier against the content of the hard disk drive utilizing an application such as an inventory index. The application is an extra repository kept in addition to the hard disk drive, and provides search capabilities for the hard disk drive based on the usage-context of the hard disk drive and the content of the data on the hard disk drive. This repository might be implemented on paper or in an electronic fashion, such as in a database. Mapping the hard disk drive identifier against its content of the hard disk drive can be a time consuming and tedious task that is prone to human error.

While in some cases the label may include more descriptive information such as information about the hard disk drive and the data content of the hard disk drive, the additional descriptive information is, however, limited by the size and available space remaining on the affixed label.

Additionally labels affixed to hard disk drives are prone to human error. For example, the label may be unreadable either because of fading, abrasion, wear, stains, or poor penmanship. In addition, labels may fall off and the information about the hard disk drive may be lost. Finally, in order for the label to maintain up-to date information the label must be updated manually by a user on a regular basis. The need for regular updates exposes the process to human error since the regular updates may be overlooked such that the label retains out of date information. In addition, the fixed capacity of the label may not allow regular updates to be recorded.

One or more hard disk drives may be integrated and configured in a disk subsystem such as a redundant array of independent drives (RAID). The disk subsystems may include up to three hundred hard disk drives or more. Generally, each hard disk drive in the RAID is required to have an identical capacity, rotational speed (RPM), and performance. Accordingly, the hard disk drives within a subsystem often have the same general outward appearance and it is therefore difficult for a user to identify a particular hard disk drive within a RAID (or other disk subsystem).

As mentioned above, a label is affixed to the hard disk drive containing information such as the serial number of the hard disk drive. However, hard disk drives are typically mounted within a carrier to facilitate easy installation and removal of a hard disk drive within a subsystem and the carrier may shield the view of the label from the user. Further, the hard disk drive can be removed from one carrier and placed into another carrier such that the serial number placed on the carrier may not be a reliable correlation to the serial number of the hard disk drive that is located in the carrier.

In addition, the contents of the hard disk drive may be changed by a storage subsystem once placed within the subsystem. The storage subsystem is often managed remotely and automatically, so the information that is placed upon the hard disk drive is not readily available, nor is the usage context of the drive obvious or discernable to a local user.

Therefore an efficient and reliable system and method is needed to allow thorough up-to-date human readable information about the data content and/or the usage context of a hard disk drive.

SUMMARY OF THE INVENTION

A method and a system are provided for displaying information on a hard disk drive assembly. The hard disk drive assembly includes a hard disk drive which further comprises a driver circuit coupled to a display and a display memory. The driver circuit activates the display mounted on the hard disk drive assembly. In response to the activation of the display the driver circuit obtains information from the display memory of the hard disk drive. The driver circuit displays at least a portion of the information obtained from the display memory on the display mounted on the hard disk drive assembly.

In one embodiment the driver circuit further comprises a control coupled to the driver circuit. The driver circuit detects that the control has been engaged a first time and, in response, activates the display. The control may be a switch, a button, a toggle, a knob, or a lever. In one embodiment the control is a four-way button. In a further embodiment, the driver circuit powers on the display.

The driver circuit determines if the control is engaged at a second time, and in response to determining that the control is not engaged at the second time, the driver circuit powers off the display. The second time is greater than a predetermined time threshold time after the first time. In one embodiment the predetermined threshold time may be determined by a user.

Finally, in one embodiment, the driver circuit obtains information by reading data from the display memory. In one embodiment the information comprises one of data content and usage context of said hard disk drive. In one embodiment the driver circuit causes the display to display information comprising a message indicating that the data is not available in response to determining that the display memory does not contain the data. In one embodiment the display is an OLED display. In a further embodiment the hard disk drive has a battery. In yet a further embodiment the hard disk drive assembly may further comprise a carrier.

BRIEF DESCRIPTION OF THE DRAWINGS

FIG. 11 shows a hard disk drive storage drawer with hard disk drives mounted in carriers with the OLED display according to a present embodiment.

DETAILED DESCRIPTION OF PREFERRED EMBODIMENTS

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

The present disclosure is described with respect to a magnetic disk drive which is also referred to herein as a disk drive or hard disk drive (HDD). However, it should be understood by one of ordinary skill in the art that the use of a hard disk drive to describe the operation of the present invention does not preclude the use of the present embodiment on other disk storage drives (e.g. optical disk storage drives, holographic disk storage drives, etc.).

Figure 1:
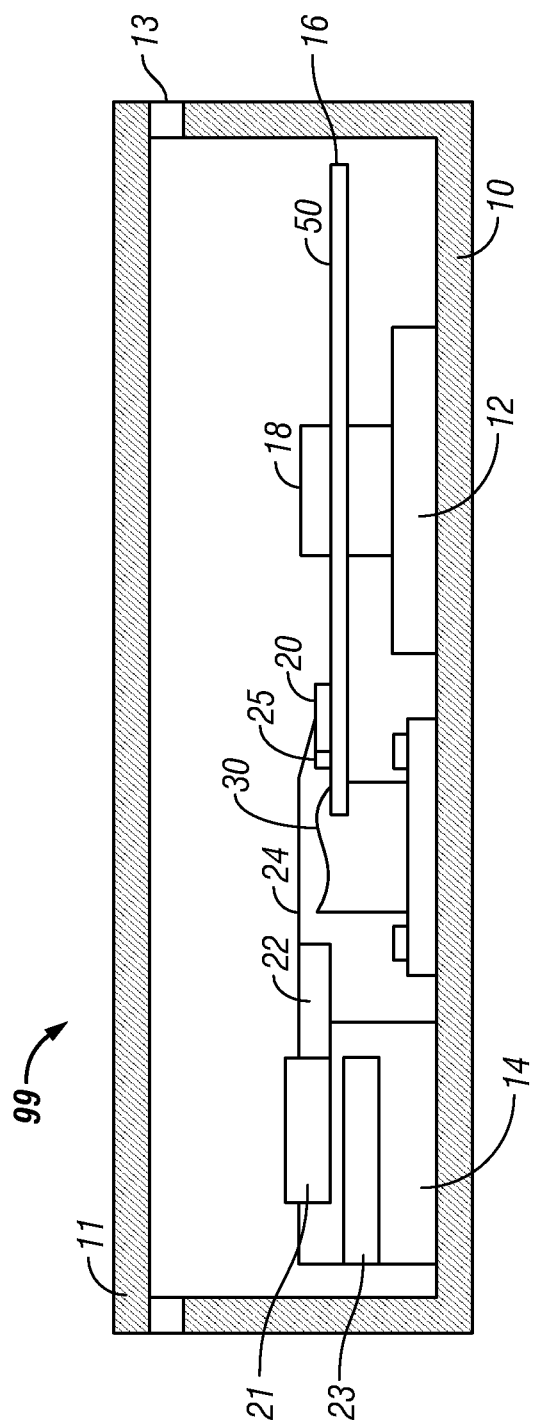
FIG. 1 shows a side view of a hard disk drive.
Figure 2:
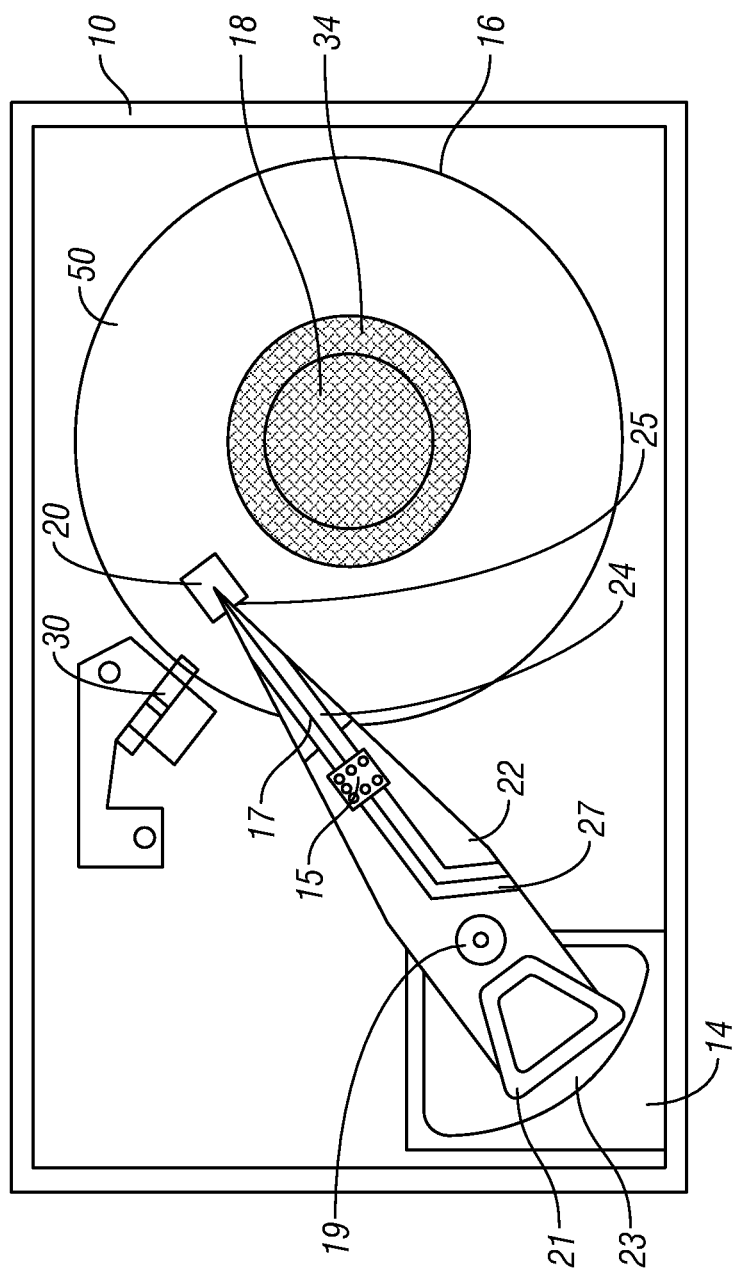
FIG. 2 shows a top view of a hard disk drive.

Referring first to FIG. 1, there is illustrated in sectional view of a hard disk drive 99 according to a present embodiment. For ease of illustration and explanation, the hard disk drive 99 depicted in FIGS. 1 and 2 is shown as having a single recording head and associated disk surface, although conventional hard disk drives may have multiple heads, one on each side of multiple disks, and the present embodiment applies equally to both multiple disk/head and single disk/head drives without limitation.

The hard disk drive 99 comprises a base 10 to which are secured a spindle motor 12, an actuator 14 and a cover 11. The base 10 and cover 11 provide a substantially sealed housing for hard disk drive 99. A gasket 13 may be located between base 10 and cover 11. A small breather port (not shown) for equalizing the air pressure between the interior of hard disk drive 99 and the outside environment may be placed in a base 10 of larger hard disk drives. Smaller hard disk drives, such as the hard disk drives used in laptops and notebooks, may not require this small breather port due to the tiny amount of free cavity volume. This type of hard disk drive is described as being substantially sealed because the spindle motor 12 is located entirely within the housing and there is no external forced air supply for cooling the interior components. A magnetic recording disk 16 is connected to spindle motor 12 by means of spindle or hub 18 for rotation by spindle motor 12. A thin film 50 of lubricant is maintained on the surface of disk 16. Recording disk 16 is the data storage media for storage of data for hard disk drive 99.

A read/write head or transducer 25 is formed on the trailing end of an air-bearing slider 20. Transducer 25 has an inductive write transducer and either a magnetoresistive (MR), giant magnetoresistive (GMR), or tunnel magnetoresistive (TMR) read transducer, all of which are formed by thin-film deposition techniques as is known in the art. The slider 20 is connected to the actuator 14 by means of a rigid arm 22 and a flexible suspension 24, the flexible suspension 24 providing a biasing force which urges the slider 20 towards the surface of the recording disk 16. The arm 22, flexible suspension 24, and slider 20 with transducer 25 are referred to as the head-slider-arm (HSA) assembly.

During operation of hard disk drive 99, the spindle motor 12 rotates the disk 16 at a constant angular velocity (CAV), and the actuator 14 pivots about shaft 19 to move slider 20 in a gentle arc that is aligned generally radially across the surface of disk 16, so that the read/write transducer 25 may access different data tracks on disk 16. The actuator 14 may be a rotary voice coil motor (VCM) having a coil 21 that moves in an arc through the fixed magnetic field of magnet assembly 23 when current is applied to coil 21. Alternately, arm 22, flexible suspension 24, slider 20, and transducer 25 could move along a radial line via a linear voice coil motor (VCM, not shown). Disk 16 may have a landing zone 34 which has a rougher surface than the recording zone so that slider 20 does not stick to the disk 16 when the disk is not spinning. Alternately, load/unload ramp 30 may be used to hold actuator-VCM 14 when the disk 16 is not spinning, so that the slider 20 is physically off of disk 16, and therefore, does not stick to the disk 16.

FIG. 2 is a top view of the interior of hard disk drive 99 with the cover 11 removed, and illustrates in better detail flexible suspension 24 which provides a force to the slider 20 to urge it toward the disk 16. The suspension may be a conventional type of suspension such as the well-known Watrous suspension. This type of suspension also provides a gimbaled attachment of the slider 20 that allows the slider 20 to pitch and roll as it rides on the air bearing. The data detected from disk 16 by transducer 25 is processed into a data readback signal by an integrated signal amplification and processing circuit in arm electronics (AE) 15, located on arm 22. The signals between transducer 25 and arm electronics 15 travel via flex cable 17. The signals between arm electronics 15 and I/O channel (312 of FIG. 3) travel via cable 27.

Figure 3:
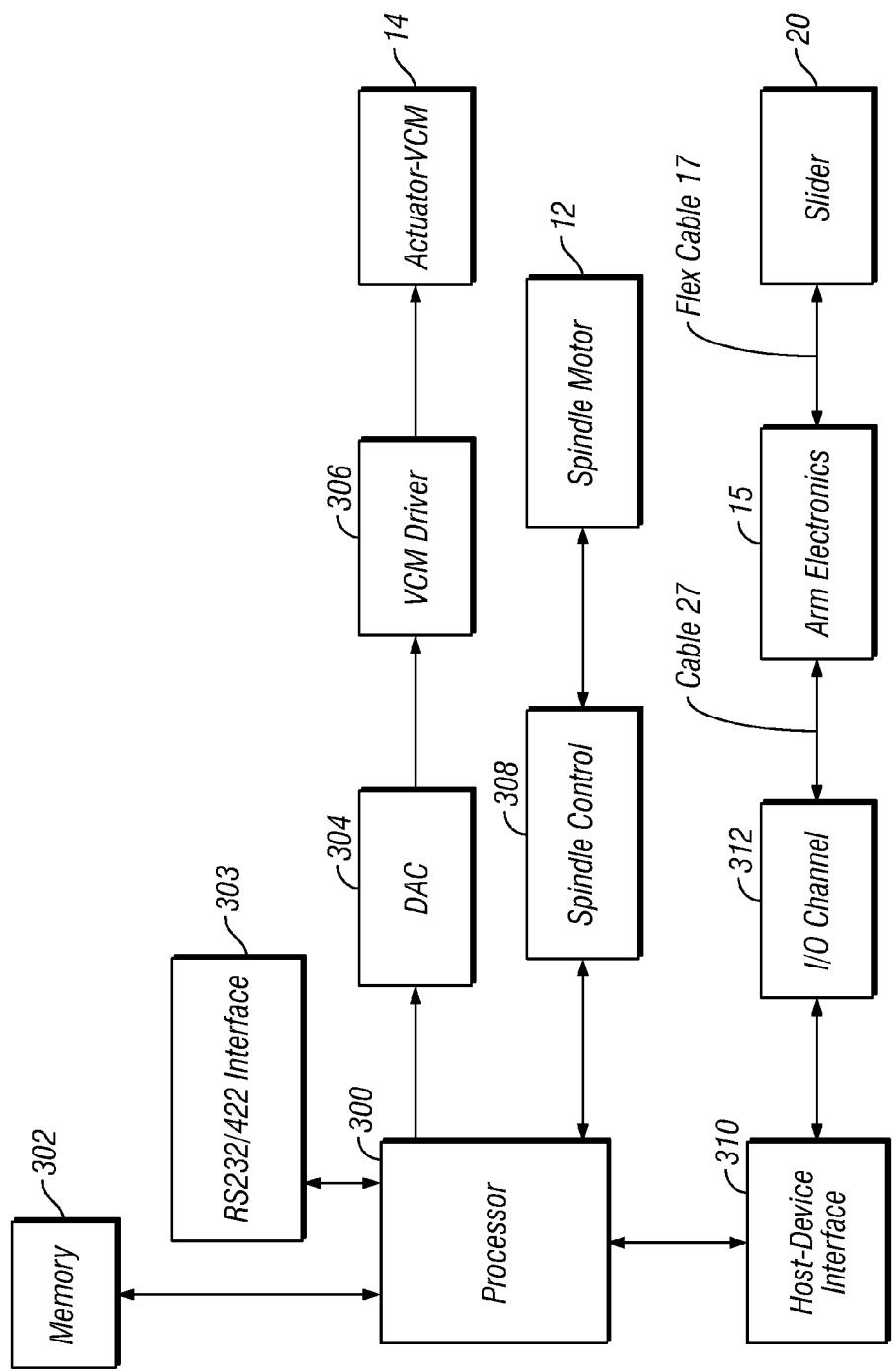
FIG. 3 shows the control circuitry of a hard disk drive.

Referring now to FIG. 3, hard disk drive electrical components include a processor 300 that processes instructions contained in memory 302 to control hard disk drive 99. Processor 300 may comprise an off-the-shelf processor, custom processor, FPGA (Field Programmable Gate Array), ASIC (Application Specific Integrated Circuit), discrete logic, etc. Memory 302 is used to hold variable data, stack data, and executable instructions. Memory 302 is preferably RAM (Random Access Memory). Processor 300 sends digital signals to digital-to-analog converter (DAC) 304, for conversion to low-power analog signals. These low-power analog signals are received by VCM driver 306. VCM driver 306 amplifies the low-power analog signals into high-power signals to drive actuator-VCM 14. Processor 300 also controls and is connected to the spindle motor 12 via spindle controller 308. Actuator-VCM 14 is energized by the VCM driver 306 which receives analog voltage signals from DAC 304. VCM driver 306 delivers current to the coil 21 of actuator-VCM 14 in one direction to pivot the head-slider-arm assembly radially outward and in the opposite direction to pivot the head-slider-arm assembly radially inward. The spindle controller 308 controls the current to the armatures of spindle motor 12 to rotate the motor during hard disk drive operation at a constant rotational speed, which is also known as constant angular velocity or CAV. In addition, the spindle controller 308 provides a status signal to processor 300 indicating whether or not spindle motor 12 is rotating at a predetermined operating speed via the back electromotive force (BEMF) voltage of spindle motor 12. The BEMF voltage of spindle motor 12 will have a nonzero value when motor 12 is rotating. Spindle motor 12 may be a brushless DC motor with three windings or three sets of individual windings.

Figure 4:
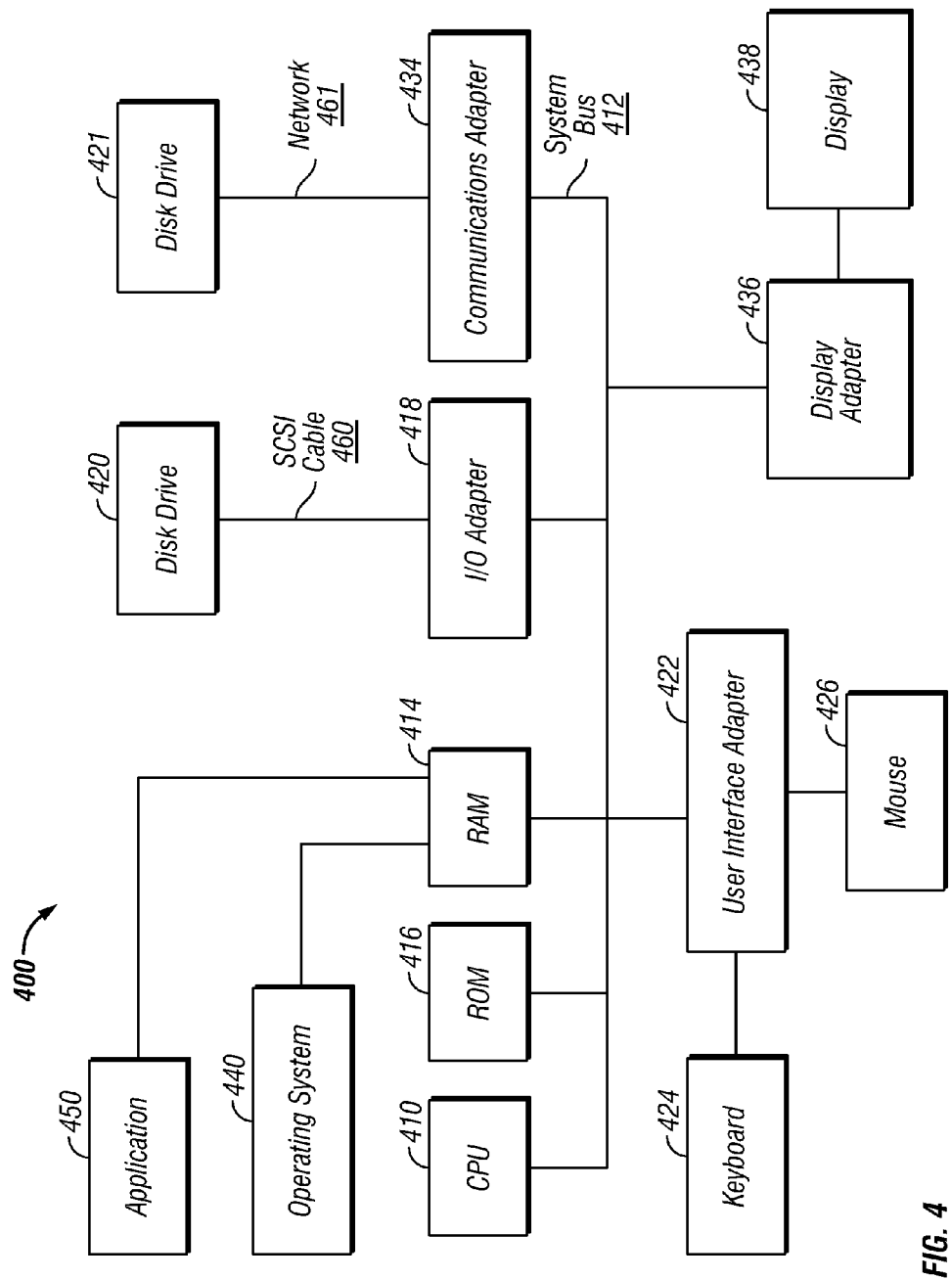
FIG. 4 shows a computer system utilizing a hard disk drive.

Host-device interface 310 is coupled to and communicates with processor 300 to send and receive commands with respect to host computer 400. Additionally, host-device interface 310 receives data from host computer 400 (as shown in FIG. 4) and sends it to I/O channel 312, where the data is encoded before being sent via cable 27 to arm electronics 15. Encoding may be accomplished via a convolution encoder. From arm electronics 15, the encoded data is sent via flex cable 17 to the inductive write transducer on slider 20 resulting in the encoded data being written to disk 16. Similarly, when data is requested by host computer 400, the MR, GMR, or TMR read transducer on slider 20 reads the encoded data off of disk 16, and sends that data to arm electronics 15 via flex cable 17. From arm electronics 15, the encoded data is sent via cable 27 to be decoded by I/O channel 312 before being sent to host computer 400 via host-device interface 310. An example of a decoder that may be used to implement in the present embodiment is a PRML (partial-response, maximum likelihood) decoder. Processor 300 may also connect to RS232/422 Interface 303 for the purpose of receiving error conditions and performing control operations.

FIG. 4 illustrates a hardware configuration of a host computer 400 utilizing the hard disk drive shown in FIGS. 1 and 2. Although the following description will proceed with reference to a host computer, it should be understood that the present embodiment may be implemented in other devices (e.g. a personal computer, server, storage controller, storage server, automated data storage library, etc.) that may interface to hard disk drives or other data storage drives (e.g. optical data storage drives, holographic data storage drives, etc.). Any reference herein to a host computer includes, without limitation, the previously mentioned devices that may interface to hard disk drives or other data storage drives.

Host computer 400 has a central processing unit (CPU) 410 coupled to various other components by system bus 412. An operating system 440 runs on CPU 410 and provides control of host computer 400 and the attached hard disk drives 420 and 421, which incorporates hard disk drive 99 to provide a data storage device to host computer 400. Keyboard 424 and mouse 426 are connected to system bus 412 via user interface adapter 422.

Read only memory (ROM) 416 is coupled to system bus 412 and includes a basic input/output system (BIOS) that controls certain functions of host computer 400. Random access memory (RAM) 414, I/O adapter 418, and communications adapter 434 are also coupled to system bus 412. It should be noted that software components including operating system 440 and application 450 are loaded into RAM 414, which is the main memory of host computer 400. I/O adapter 418 and Communications adapter 434 are two examples of data storage device interfaces that may be used to interface and couple hard disk drives 420, 421 to host computer 400. I/O adapter 418 may be a small computer system interface (SCSI) adapter. SCSI cable 460 is connected between I/O Adapter 418 and Host-Device Interface 310 of FIG. 3 so that host computer 400 communicates with hard disk drive 420. Similarly, communications adapter 434 communicates with Network Attached Storage (NAS) hard disk drive 421 via network 461. Communications adapter 434 may be an Ethernet, Fiber Channel, Fibre Channel over Ethernet, ESCON, FICON, Wide Area Network (WAN), or TCP/IP interface. Additionally, other embodiments of data storage device interfaces, cables, protocols, etc., may be used to interface and couple hard disk drives 420, 421 to host computer 400, either using host device interface 310 or another equivalent interface, without limitation. A display monitor 438 is connected to system bus 412 by display adapter 436.

Figure 5:
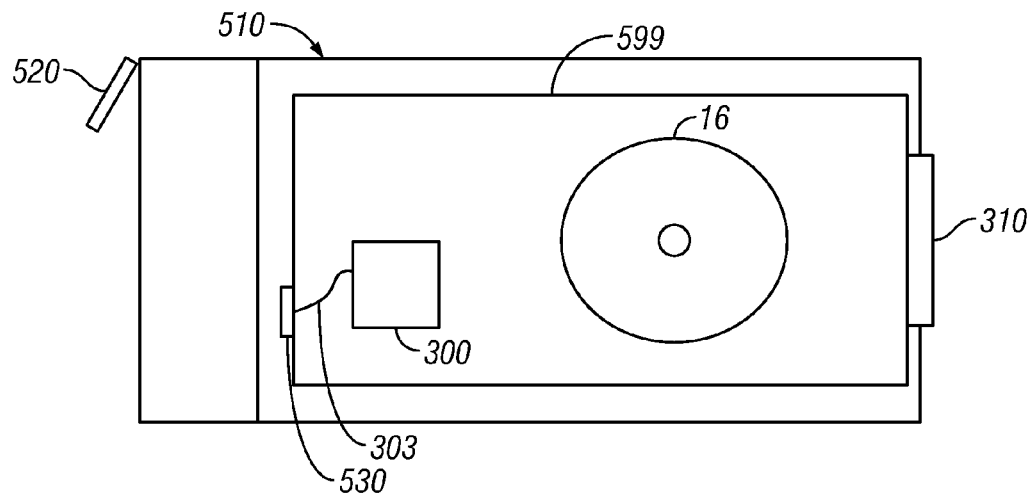
FIG. 5 shows a hard disk drive mounted in a carrier.

FIG. 5 shows a prior-art hard disk drive 599 mounted in a carrier 510 for easy installation and removal from a storage system. Host-device interface 310 may be Fibre Channel, SCSI, iSCSI, SAS (serial attach SCSI), Ethernet, Fibre-Channel-over-Ethernet (FCoE), or any other interface for communicating with a drawer backplane. When lowered, latch 520 locks the carrier in place in the storage hard disk drawer, and when raised, latch 520 facilitates the removal of carrier 510 from the storage drawer. Hard disk drive processor 300 has RS232/422 interface 303, which is connected to jumper block 530 of carrier 510. Jumper block 530 may be used to give access to the host to error-conditions and pass control information between the host computer 400 and hard disk drive 599.

Figure 6:
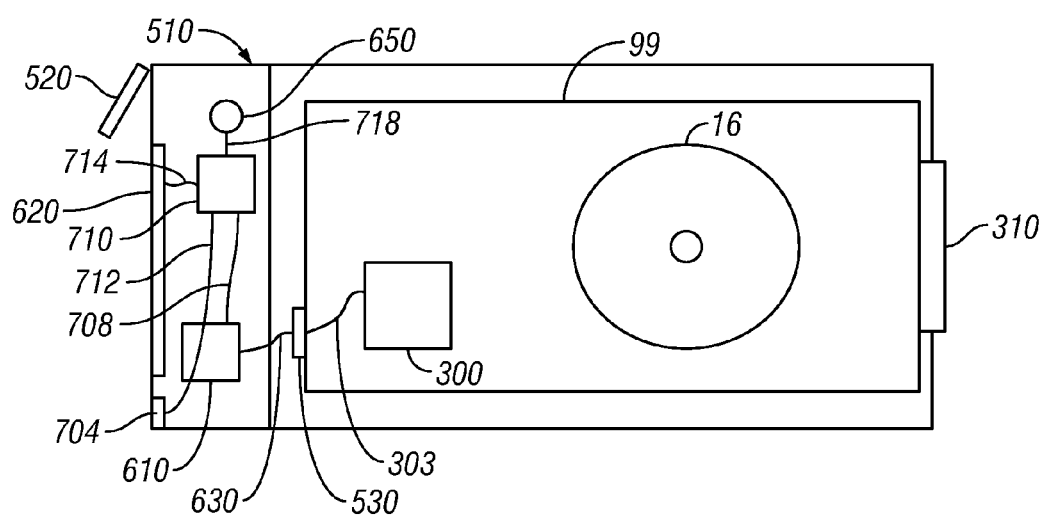
FIG. 6 shows a hard disk in a carrier with an OLED display in accordance with the present embodiment.
Figure 7:
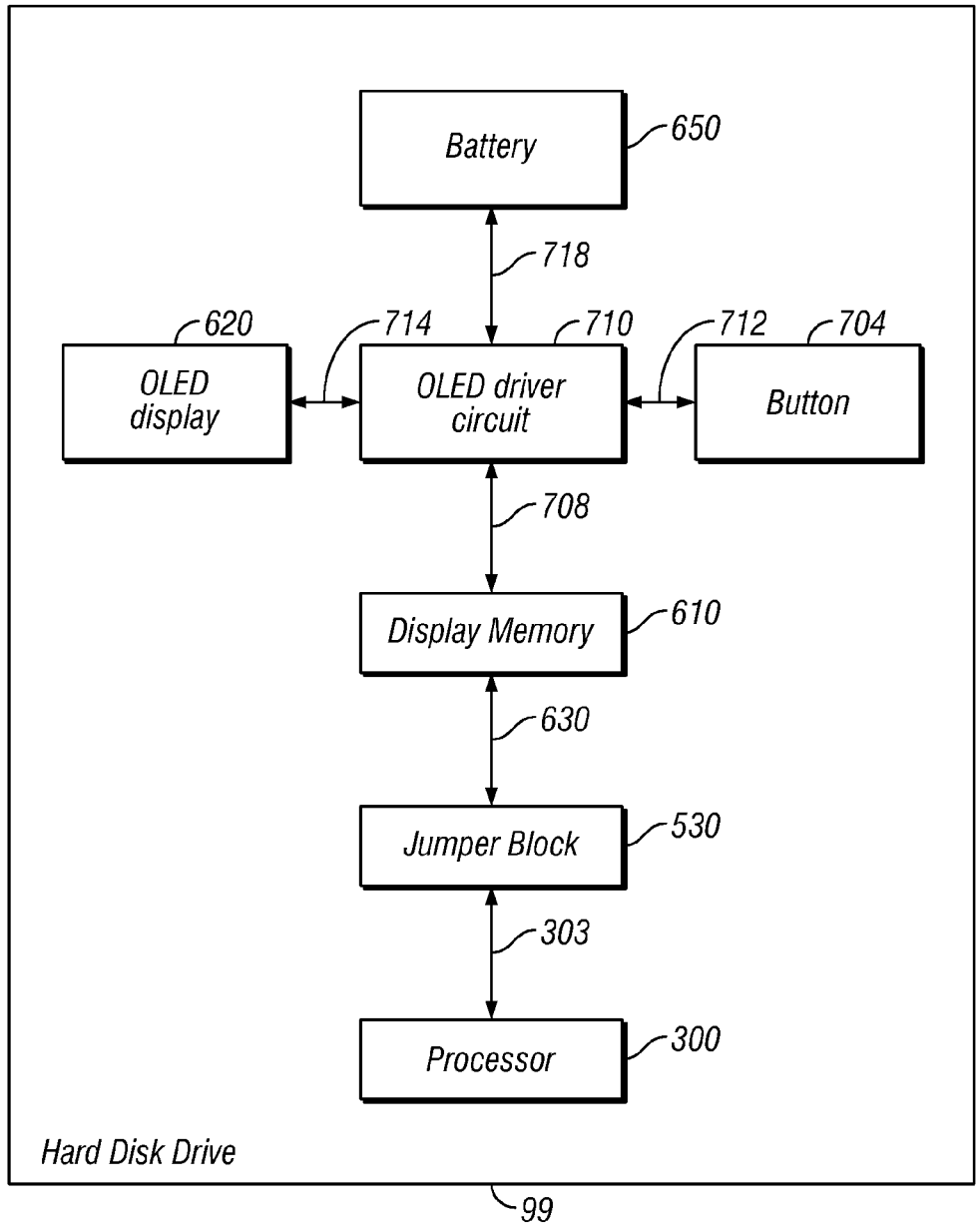
FIG. 7 is a generalized block diagram of a hard disk in a carrier with an OLED display in accordance with the present embodiment.

FIG. 6 and FIG. 7 describe a hard disk drive 99 according to the present embodiment. As shown in FIGS. 6 and 7, the present embodiment implements OLED technology for display of hard disk drive information by mounting an OLED display 620 on a hard disk drive assembly. In the context of this description hard disk drive assembly is defined to comprise the hard disk drive 99 and carrier 510 in a first embodiment and to comprise hard disk drive 99 without carrier 510 in another embodiment. As mentioned above, in some embodiments, the hard disk drive 99 is mounted within carrier 510 to facilitate easy installation and removal of a hard disk drive within a storage system. However, it is important to note in other embodiments hard disk drive 99 may be mounted within a storage system without a carrier. Therefore, in an embodiment in which the hard disk drive 99 is mounted in carrier 510, the OLED display 620 is mounted on the carrier 510. In another embodiment in which the hard disk drive 99 is not mounted in a carrier the OLED display 620 is mounted on the hard disk drive 99 (e.g. the base 10 and/or cover 11 of hard disk drive 99). Further the OLED display 620 may be mounted on the hard disk drive assembly by any known means (e.g. adhesive, fasteners, etc.) or may be formed integrally with the hard disk drive assembly.

The OLED display 620 may display information regarding the data content and the usage context of the hard disk drive 99. Data content may include a description of the data content such as the data set names, a directory index or table, file names of the data files, error history of the data stored on the hard disk drive 99, the application and/or format the data is stored in on the hard disk drive 99 (e.g. a word processing application such as Microsoft Word, Lotus Word Pro, or WordPerfect; a spreadsheet such as Microsoft Excel, WordPerfect Office Quattro Pro, or Lotus SmartSuite Lotus 123; and presentation programs such as Microsoft PowerPoint, Lotus SmartSuite Freelance Graphics, etc.). Data content may also include hard disk drive 99 manufacturing information, the volume serial number of the hard disk drive 99, the creator of the data, the date and/or time of the last write to the hard disk drive 99, the date and/or time of the last read or access of data on the hard disk drive 99, the user name, system name, or application name of the last write to the hard disk drive 99, the user name, system name or application name of the last read of the hard disk drive 99, as well as other attributes pertaining to data.

The usage-context of the hard disk drive 99 may include information about whether the hard disk drive 99 is primary or backup in a mirror, or what position the particular hard disk drive 99 is in a hierarchal storage network. In addition, the usage context of the hard disk drive 99 may include information regarding whether the particular hard disk drive 99 is used for cache or as removable hard disk drive in a storage library. Further the usage context of the hard disk drive 99 may include information regarding the group or rank to which the hard disk drive 99 is assigned within a RAID storage subsystem. The usage context may include the current status of the rank, such as whether the rank is in normal mode, failed mode, degraded mode, or rebuilding mode. In addition, the usage context may include the functional status of the hard disk drive 99, the spin-up status of the hard disk drive 99, the system or operator that configured the rank, whether the rank is a primary or secondary of a mirrored pair, the capacity and rotational velocity of the hard disk drive 99, the amount of cache, the microcode and hardware levels of the hard disk drive 99, the number of spare sectors assigned in the hard disk drive 99, the rate of soft read errors, and the number of times the hard disk drive has been formatted. The usage-context may also include information indicating that the hard disk drive 99 is a write-once, read-many (WORM) or is rewritable. The hard disk drive information displayed on the OLED display 620 may further include readable information and instructions on how to read the data and/or how to format the data to make the data visible. In one embodiment the information regarding how to read the data may reference a hard disk drive system that is required to read the data. It may further include information on what command set is used to read data such (e.g. the SCSI-3 command set). It may further comprise information about the block size and the data-structure of the data stored on the hard disk drive 99. In another embodiment the information may include the source code of a sample program that allows the user to read the data. The information to make the data visible includes instructions or information about the format or of the data and information about a system or application required to properly format the data such that it is data visible and human-readable. Similarly, the information may include sample source code which can be used to make the data properly formatted and thus, visible and human readable.

It is important to note that hard disk drive 99 may be a factory-enclosed unit, and therefore, the hard disk media within the hard disk drive is not physically accessible by a user without voiding all manufacturer warranties.

OLED technology may be implemented with very thin architecture (e.g. less than 1 mm), thus allowing it to be mounted on the hard disk drive assembly (e.g mounted on the carrier 510 if a carrier is utilized in the current embodiment or mounted on the hard disk drive 99 if a carrier is not utilized in the current embodiment) without changing the dimensions of hard disk drive assembly appreciably. Referring to FIG. 6, hard disk drive 99 is mounted in a carrier 510. OLED display 620 is mounted on hard disk drive carrier 510 and is connected to an OLED driver circuit 710 via display connection 714. OLED display 620 may be encapsulated by a transparent plastic substrate providing durability, flexibility and a low cost. Non-volatile flash display memory 610 is connected to OLED driver circuit 710 via memory link 708. Further, display memory 610 is connected to jumper block 530 via serial cable 630. Hard disk drive processor 300 is connected to jumper block 530 of hard disk drive assembly (e.g. hard disk drive 99 and carrier 510) by a RS232/422 interface 303. Processor 300 writes information to display memory 610 allowing processor 300 to control what is stored in display memory 610, and consequently, what is displayed on OLED display 620.

Battery 650 is connected to OLED driver circuit 710 via battery connection 718. In one embodiment battery 650 provides power to OLED display 620, OLED driver circuit 710 and display memory 610. In an alternative embodiment, when the carrier 510 with hard disk drive 99 is connected to the disk storage subsystem the OLED display 620, OLED driver circuit 710, and the display memory 610 are powered by the power provided to the hard disk drive 99. As mentioned above, the individual hard disk drives 99 receive power through a hard-wired connector, which may be included as part of host-device interface 310 or be a separate cable attachment (not shown). When the carrier 510 with hard disk drive 99 is disconnected from the disk storage subsystem, the OLED display 620 may be powered by a battery 650.

Hard disk drive carrier 510 includes a control 704 to manually and temporarily power-on OLED display 620 for the display of hard disk drive 99 information. Control 704 is illustrated in FIGS. 6 and 7, and discussed herein as a button; however, it should be understood that control 704 may also be implemented as a switch, toggle, knob, or any other sensor capable of detecting a users input to manually and temporarily power-on OLED display 620 for the display of information. Button 704 is connected to OLED driver circuit 710 via button connection 712. As seen in FIG. 6, in one embodiment, button 704 may be located on the lower-left corner of carrier 510, adjacent OLED display 620. However, it should be understood by on or ordinary skill in the art that button or control 704 may be placed anywhere on carrier 510, in an embodiment in which a carrier is utilized, or anywhere on hard disk drive 99 (e.g. the base 10 or cover 11), in an embodiment in which a carrier is not being utilized. Button 704 is used to toggle OLED display 620 on or off.

In one embodiment, a user may press button 704 (or another control is engaged into an "on" position) for a period of time to scroll the information displayed. In an additional embodiment, button 704 may be implemented as a four-way button allowing the user to scroll in four directions. The four-way button 704 may be pressed up or down to allow scrolling up and down, respectively. In addition, the four-way button may be pressed left or right to allow scrolling left and right. Scrolling allows images and messages to be displayed and read that are larger than the OLED display 620 can display at any one time. By allowing scrolling of an image more detail of the image may be displayed. The OLED driver circuit 710 determines the direction that the four-way button 704 is being pressed and applies the requested direction to the information being displayed. In one embodiment the four-way button may be implemented as a toggle similar to the "eraser head" used in many keyboards of computer notebooks.

OLED driver circuit 710 is used to control the OLED display 620 and to display the hard disk drive information on OLED display 620. OLED driver circuit 710 includes a display driver logic, which enables the OLED driver circuit 710 to read information out the display memory 610 via memory link 708. As mentioned above, OLED driver circuit 710 has a button connection 712 to button 704 in order to sense the state of the button 704 (e.g. whether the button or any other control is pressed or engaged in any way) and to drive the scroll operations. OLED driver circuit 710 also has a display connection 714 to the OLED display 620 for transmitting signals to be displayed. The OLED driver circuit 710 is powered by power provided to hard disk drive 99. The individual hard disk drives 99 receive power through a hard-wired connector, which may be included as part of host-device interface 310 or be a separate cable attachment (not shown).

In one embodiment the OLED display 620 remains in a powered-off state unless button 704 is pressed (or another control is pressed or engaged to an "on" position). In a further embodiment, the OLED display 620 and the OLED driver circuit 710 are preconfigured to remain in a powered-on state for a predetermined threshold amount of time. In one embodiment, the predetermined threshold time is determined by the user. Alternatively, predetermined threshold time may be determined by the manufacturer of the hard disk drive 99. The predetermined threshold time may be a matter of seconds, minutes, or hours, etc. For example the predetermined threshold time may be 20 seconds, such that if it is determined that 20 seconds have elapsed since button 704 (or another control) was last pressed, the OLED display 620 is automatically powered-off. In one embodiment the predetermined threshold time may be set to zero seconds during the shipment of a hard disk drive 99 to prevent any unauthorized access to information regarding hard disk drive 99.

In one embodiment an application interacts with hard disk drive 99 using a protocol language (e.g. SCSI). The SCSI protocol provides the WRITE BUFFER command (as described further below with respect to FIG. 8) which may be used to allow a host-resident application, such as application 450 of FIG. 4, to transmit specific requested data to the hard disk drive 99. The application writes the data to be displayed on the OLED display 620 to the processor 300 of hard disk drive 99 using SCSI command (e.g. WRITE BUFFER). The processor 300 of hard disk drive 99 subsequently interacts with display memory 610 of carrier 510 and writes the data to display memory 610. In one embodiment, the data is written to the separate portion of display memory 610 dedicated for the OLED display 620. The OLED driver circuit 710 reads data from the display memory 610 or the separate portion of the display memory. The OLED driver circuit 710 converts the data in display memory 610 to displayable information and displays the information on the OLED display 620. In this way, the application can write data to the OLED display 620 which describes the content of the data stored on that particular hard disk drive, and if necessary, the usage-context of that data. For example, if a given hard disk drive 99 stores a file system, the application can cause the directory structure of the file system to be displayed on OLED 620 mounted on carrier 510 of hard disk drive assembly. This allows a user to identify a hard disk drive 99 included in a system.

Figure 8:
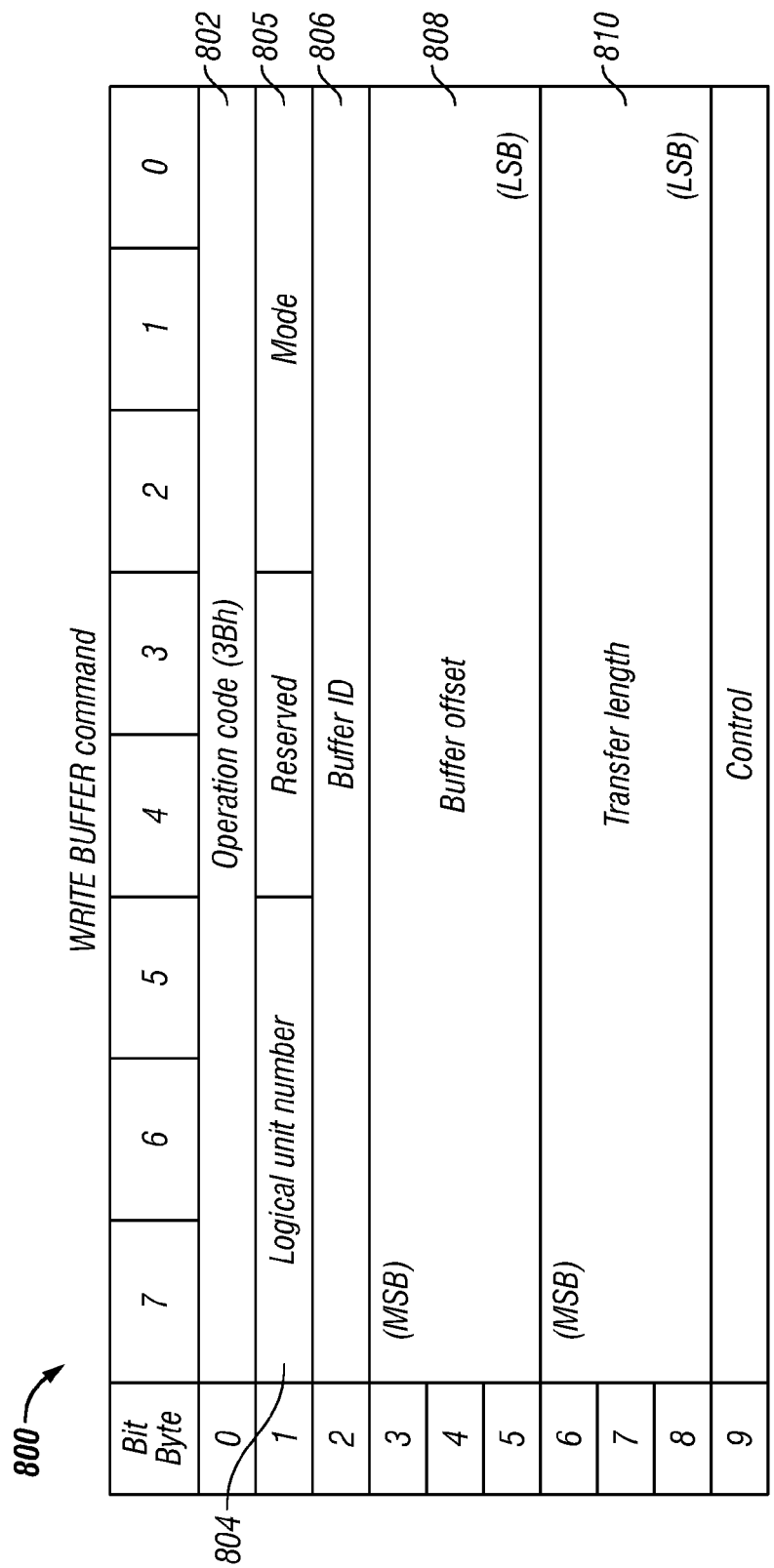
FIG. 8 is an example of a write buffer command according to the present embodiment.

The SCSI WRITE BUFFER command 800 which can be used by the host application, such as application 450 of FIG. 4 to provide the displayable data to the display memory 610 for OLED display 620 is shown in FIG. 8. The WRITE BUFFER command has a command code 802 of 3Bh (wherein h refers to hexadecimal, as understood by one of ordinary skill in the art). The command is sent by an initiator such as a host-resident application to a target such as processor 300 of hard disk drive 99 with the specified Logical Unit Number 804, which identifies which LUN is used in the multi-LUN SCSI connector. The mode parameter 805 shall be set to 010b (wherein b refers to binary), indicating that there is a subsequent data transfer. The buffer ID 806 specifies a buffer within hard disk drive 99 such as display memory 610 or a portion of display memory 610 that is used for the OLED display 620. The buffer offset 808 specifies the offset within the buffer denoted by buffer ID 806 and can be 0h (wherein h refers to hexadecimal) in one embodiment. The transfer length 810 denotes the number of bytes being transferred from the application to the display memory 610 of carrier 510 in the subsequent DATA OUT phase according to SCSI protocol. The data transferred is stored in display memory 610. In one embodiment the data transferred is stored in a portion of display memory 610 dedicated for the OLED display 620.

The OLED driver circuit 710 reads data from display memory 610, converts the data in display memory 610 to displayable information and displays the data on the OLED display 620. In one example, when button 704 is pressed, the OLED driver circuit 710 reads information out of display memory 610 and transmits the data to OLED display 620 using the OLED driver circuit connection 714.

Figure 9:
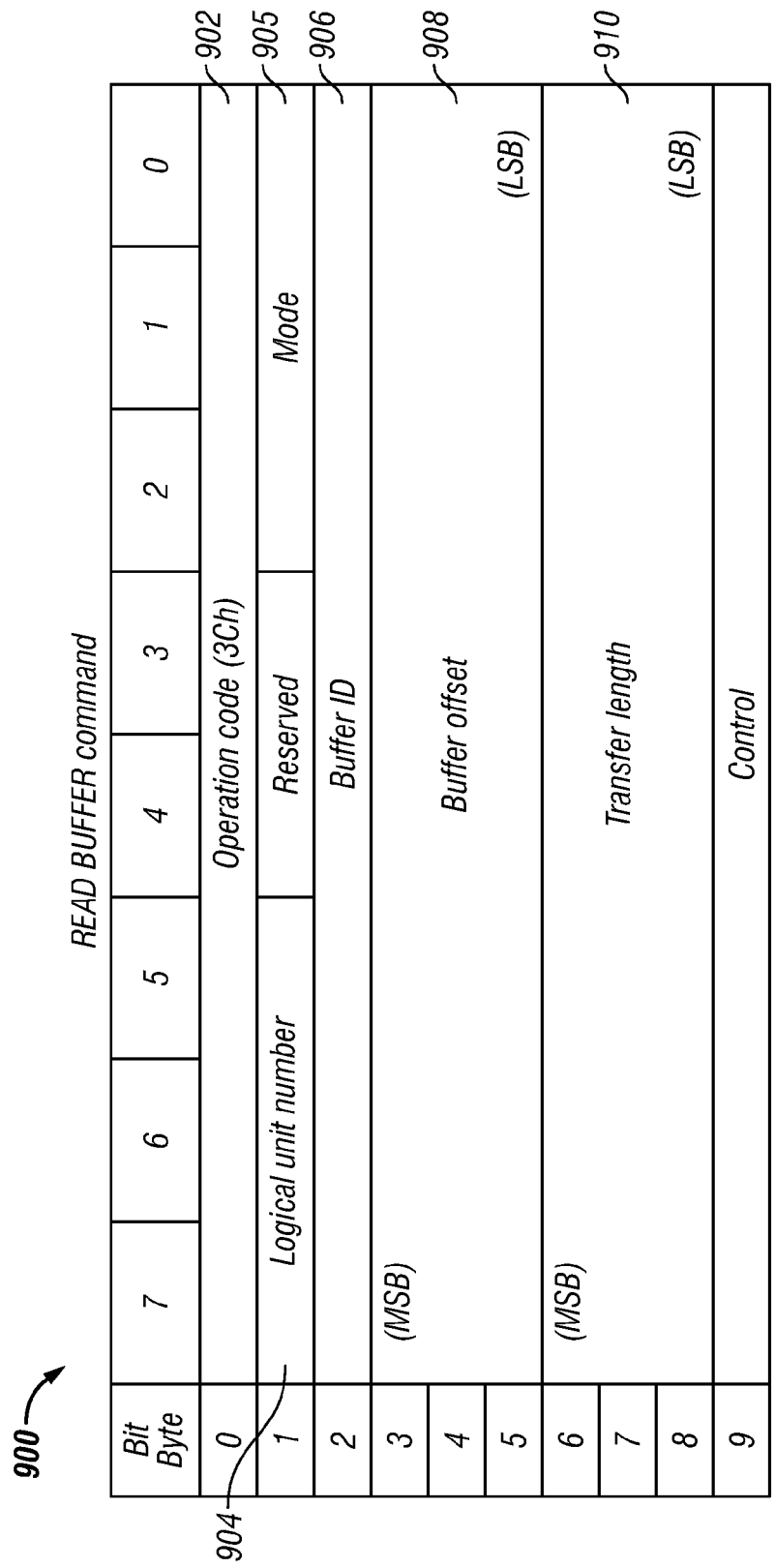
FIG. 9 is an example of a read buffer command according to the present embodiment.

As shown in FIG. 9, the READ BUFFER command 900 has a command code 902 of 3Ch (wherein h refers to hexadecimal). The command is sent by an initiator, such as a host-resident application, such as application 450 of FIG. 4, to a target, such as the hard disk drive 99 with the specified Logical Unit Number address 904. The mode parameter 905 is set to 010b (wherein b refers to binary), which indicates that there is a subsequent data transfer. The buffer ID 906 specifies a buffer within display memory 610, or the separate portion of display memory 610 dedicated for the OLED display 620. The buffer offset 908 specifies the offset within the buffer denoted by buffer ID 906 and can be 0h (wherein h refers to hexadecimal) in one embodiment.

The transfer length 910 denotes the number of bytes to be transferred from the processor 300 of hard disk drive 99 to the host-resident application (not shown) in the subsequent DATA IN phase of SCSI protocol. The data transferred is read from display memory 610, or the separate portion of display memory 610 dedicated for the OLED display 620. Thus, a host application can query the information displayed for a particular disk drive 99.

Figure 10:
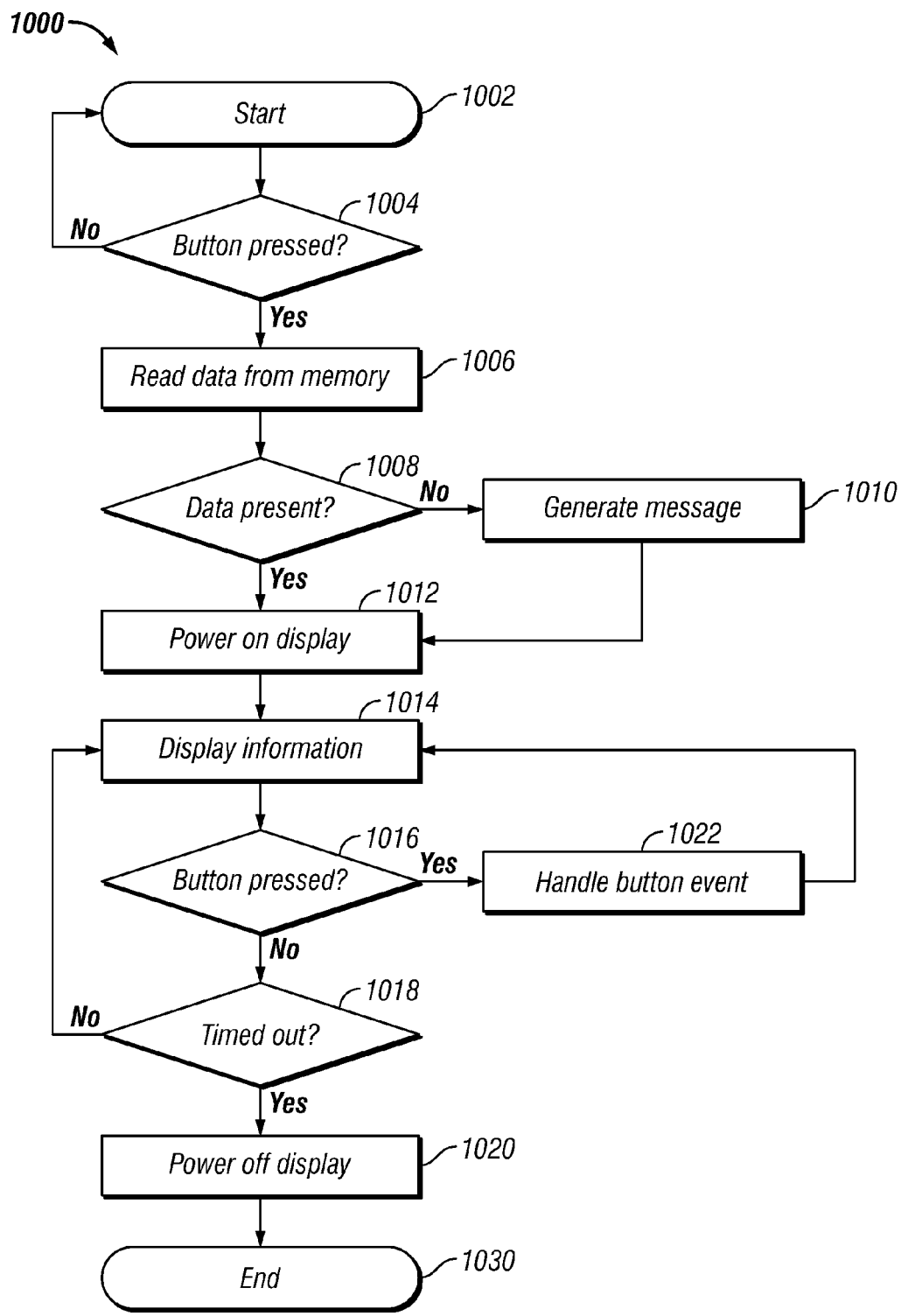
FIG. 10 is a process for displaying hard disk drive information according to the present embodiment.

FIG. 10 shows the process of displaying hard disk drive information on an OLED display 620 mounted on the hard disk drive carrier 510 of hard disk drive assembly. The process starts in step 1002 and continues to step 1004. In step 1004, the OLED driver circuit 710 determines if the OLED display 620 has been activated. In one embodiment, the OLED driver circuit 710 determines if the OLED display 620 has been activated by determining if button 704 has been engaged at a first time (or another control is pressed or engaged in any way) through button connection 712.

If OLED driver circuit 710 determines the OLED display 620 has been activated (e.g. that the button 704 has been pressed or another control is pressed or engaged in any way) the process continues to step 1006. If the OLED driver circuit 710 determines that the OLED display 620 has not been activated (e.g. the button 704 has not been pressed or another control is pressed or engaged in any way) the process flows back to step 1002.

In step 1006 the OLED driver circuit 710 obtains information from the display memory 610. In one embodiment the OLED driver circuit 710 obtains information from the display memory 610 by reading data from the display memory 610. In step 1008, the OLED driver circuit 710 determines if the display memory 610 contains the requested data to be displayed. The OLED driver circuit 710 determines if the requested data is available by determining if the requested data is saved in display memory 610. If the OLED driver circuit 710 determines that the display memory 610 does contain the requested data then the process continues to step 1012. If the OLED driver circuit 710 determines that the display memory 610 does not contain the requested data then the process flows to step 1010. It is important to note that while the display memory 610 may not contain the requested data, the step of reading data from the display memory 610 does indeed obtain information, namely that the display memory 610 does not contain the requested data. In step 1010 the OLED driver circuit 710 generates a message indicating that the display memory 610 does not contain the requested data to be displayed. In step 1012 the OLED driver circuit 710 powers on the OLED display 620.

In step 1014 the OLED driver circuit 710 converts the message generated in step 1010 and/or the requested data in display memory 610 read in step 1006 to displayable information and displays the information on the OLED display 620. If the display memory 610 does not contain the requested data a default message may be displayed (e.g. "status normal and operational", "no data", etc.) indicating that the requested data is not available. In one embodiment, if the display memory 610 does not contain the requested data, in addition to the default message at least a portion of the data content of the hard disk drive 99 (e.g. a directory of contents of the hard disk drive) and/or the usage context of the hard disk drive 99 (e.g. whether the disk is archive, backup, mirror, WORM, etc.) that is available is displayed on OLED display 620.

In an alternative embodiment the processor 300 may sense a specific error or malfunction, and in response, the processor 300 sends information to OLED driver circuit 710, via display memory 610, which is then displayed on OLED display 620 indicating the error or malfunction. For example, the OLED display 620 may display "Please replace me" or "Please send me to the product engineers."

In step 1016 the OLED driver circuit 710 determines if button 704 is pressed at a second time (or another control is pressed or engaged in any way). If the OLED driver circuit 710 determines that the button 704 was pressed the process flows to step 1022 where the button press event is handled. For example, the user may continue to press button 704. As mentioned above, in one embodiment, the user may press button 704 for a period of time to scroll the information displayed. Further, button 704 may be implemented as four-way button allowing the user to scroll in four-directions. The four-way button may be pressed up or down to allow scrolling up and down, respectively. In addition, the four-way button may be pressed left or right to allow scrolling left and right. Scrolling allows images and messages to be displayed and subsequently read that are larger than the OLED display 620 can display at any one time. By allowing scrolling of an image more detail of the image may be displayed. The OLED driver circuit 710 determines the direction that the four-way button is being pressed in step 1022 and applies the requested direction to the information being displayed as described in step 1014. In one embodiment the four-way button may be implemented as a toggle similar to the "eraser head" used in many keyboards of computer notebooks.

If the OLED driver circuit 710 determines that the button 704 was not pressed at a second time (or another control pressed or engaged in any way) the process flows to step 1018 in which the OLED driver circuit 710 determines if the OLED display 620 has timed out. The OLED driver circuit 710 determines if the OLED display 620 has timed out since last being pressed (or another control engaged in any way), by determining if the time that has elapsed is greater than the predetermined time threshold as discussed above. If the time elapsed since the button 704 was last engaged (e.g. a first time as described step 604) is less than the predetermined time threshold, the OLED display 620 has not yet timed out and the process returns to step 1014 wherein the information continues to be displayed. If the time elapsed since the button 704 was last engaged (e.g. a first time as described step 604) is greater than the predetermined time threshold, the OLED display 620 has timed out and the process continues to step 1020. In step 1020 the OLED driver circuit 710 powers off the OLED display 620. Advantageously, power may be conserved with the inactivity timeout power off of step 1020. The inactivity timeout power off of step 1020 may be further advantageous in the embodiment in which battery 650 within the OLED display 620 powers OLED display 620. The process ends at step 1030.

Although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of the processes described herein may be performed in any order practical. Further, some steps may be performed simultaneously, in parallel, or concurrently. Moreover, some steps may be omitted. For example, in one embodiment, the display may be powered on (step 1012) before the OLED driver circuit 710 reads data from the display memory 610 (step 1006).

Each of the blocks of the flow diagram of FIG. 10, and those depicted in subsequent figures, may be executed by a module (e.g., a software module) or a portion of a module or a computer system user. The methods described herein, the operations thereof and modules for performing such methods may therefore be executed on a computer system configured to execute the operations of the method and/or may be executed from computer-readable media. The method may be embodied in a machine-readable and/or computer-readable medium for configuring a computer system to execute the method. The software modules may be stored within and/or transmitted to a computer system memory to configure the computer system to perform the functions of the module. Alternatively, such actions may be embodied in the structure of circuitry that implements such functionality, such as the micro-code of a complex instruction set computer (CISC), firmware programmed into programmable or erasable/programmable devices, the configuration of a field-programmable gate array (FPGA), the design of a gate array or full-custom application-specific integrated circuit (ASIC), or the like.

Those skilled in the art will also recognize that the boundaries between modules and operations depicted herein are merely illustrative and alternative embodiments may merge such modules or operations, or impose an alternative decomposition of functionality thereon. For example, the actions discussed herein may be decomposed into sub-operations to be executed as multiple computer processes. Moreover, alternative embodiments may combine multiple instances of a particular operation or sub-operation. Furthermore, those skilled in the art will recognize that the operations described in exemplary embodiment are for illustration only. Operations may be combined or the functionality of the operations may be distributed in additional operations in accordance with the present embodiment. As will also be apparent to those of skill in the art, methods for determining delay and jitter described herein may employ other techniques (similar in effect to those described herein) to make such determinations, and such alternative techniques are intended to be comprehended by the methods and apparatus discussed herein.

As mentioned above, the predetermined threshold time may be determined by the user. Alternatively, the predetermined threshold time may be set by the manufacturer or system administrator. Further, the predetermined threshold time may be a matter of seconds, minutes, or hours, etc. For example the predetermined threshold time may be 60 seconds, such that if it is determined that 60 seconds have elapsed since button 704 (or another control) was engaged, the OLED display 620 is automatically powered-off. In an embodiment in which carrier 510 is connected to the disk storage subsystem the predetermined threshold time may be extended.

FIG. 11 shows a hard disk drive drawer 1100 containing eight hard disk drive carriers 510. It should be understood by one ordinary skill in the art that while eight hard disk drive carriers 510 are being shown in the hard disk drive drawer 1100, any number of hard disk drive carriers 510 may be implemented in a hard disk drawer 1100. Each carrier 510 has an OLED display 620, allowing an application to display information about a particular hard disk drive 99 (within its carrier 510 and hence not visible in FIG. 11) on the OLED display 620 mounted each respective carrier 510.

The described embodiment of an OLED display 620 mounted to a hard disk drive 99, or the customer accessible portion of carrier 510 of hard disk drive 99, allows for a human-readable, up-to-date, and reliable information regarding the data content and usage context of a hard disk drive 99.

As mentioned above, disk subsystems may include more than three hundred hard disk drives, configured in RAID-arrays, extents, and volumes. All hard disk drives within a subsystem look the same so that it is difficult for a user to identify a particular hard disk drive. In the present embodiment, the OLED driver circuit 710 may write information regarding a hard disk drive 99 to OLED display 620 mounted to each hard disk drive assembly (e.g mounted on the carrier 510 if a carrier is utilized in the current embodiment or mounted on the hard disk drive 99 if a carrier is not utilized in the current embodiment) allowing the hard disk drives 99 to be distinguished from each other. For example, the OLED drive circuit 710 may write information regarding the data content such as the array, extend and volume information (e.g. Array 1 (RAID-5), Extent 3, Volume 6) to the OLED display 620. This information allows a user to uniquely identify a hard disk drive within a disk system (such as that shown in FIG. 11).

Since the OLED display 620 is connected to display memory 610 through memory link 608, the requested information may be determined without the use of an extra repository or a manual search (e.g. an application or an inventory index). Information may, therefore, be more efficiently obtained. In addition, the display memory 610 is updated regularly assuring that the information displayed on OLED display 620 is up-to-date and reliable. Further, the update of hard disk drive 99 information is much more time efficient since the labels no longer need to updated manually by a user. The OLED display 620 also allows for additional information to be displayed as compared to the fixed amount that the prior art label would allow. The scrolling feature and the four-way button allow a user to navigate the displayed information to read all available information, as well as to see additional detail. Finally, the user may customize information displayed based on the user's individual needs or based on the data content and/or the usage-context of the hard disk drive 99.

While the preceding examples illustrate and discuss a hard disk drive assembly comprising a hard disk drive 99 mounted in a carrier 510, one of ordinary skill in the art should understand that in another embodiment the hard disk drive assembly may not comprise a carrier. In the embodiment in which the hard disk drive assembly does not comprise a carrier the OLED display 620 and the control 704 are not mounted on the carrier 510, but rather the hard disk drive 99 (e.g. the base 10 and the cover 11) itself.

Although the embodiments shown use hard disk drives, one skilled in the art will recognize the embodiments equally apply to optical disk drives and holographic disk drives or other disk-storage drives.

While particular embodiments of the present invention have been shown and described, it will be obvious to those skilled in the art that, based upon the teachings herein changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims.

The invention claimed is:

1. A method comprising:
    activating a display mounted on a hard disk drive assembly, said activating comprising detecting that a control is engaged at a first time;
    obtaining usage context from a cache of said hard disk drive assembly in response to said activation of said display mounted on said hard disk drive assembly, wherein the usage context comprises a rank status in a RAID configuration, the rank status including an indication of whether the rank is in one of a plurality of modes, the plurality of modes comprising a normal mode, a failed mode, a degraded mode, and a rebuilding mode; and information of an amount of free space in the cache, a microcode in the cache, hardware levels of the cache, a spin-up status of said hard disk, an operator that configured the rank, and a rotational velocity of said hard disk;

displaying on said display mounted on said hard drive assembly at least a portion of said information obtained from said cache;

determining, at a second time, if said control is engaged; and in response to determining that said control is not engaged, powering off said display, wherein said second time is greater than a predetermined time threshold time after said first time.

2. The method of claim 1, wherein detecting that said control is engaged comprises detecting engagement of one of a switch, a button, a toggle, a knob, or a lever.

3. The method of claim 2, wherein said control is a button and wherein detecting that said button is engaged comprises detecting engagement of a four-way button.

4. The method of claim 1, wherein activating said display comprises activating an OLED display.

5. The method of claim 1, wherein said predetermined threshold time is determined by said user.

6. The method of claim 1, wherein displaying said information comprises reading data from said cache.

7. The method of claim 1, wherein, in response to determining that said cache does not contain said data, displaying a message indicating that said data is not available.

8. A hard disk drive assembly comprising:
a hard disk drive comprising:
a display;
a display memory comprising a cache;
a driver circuit coupled to said display and said display memory, wherein said driver circuit is configured to:
activate said display mounted on said hard disk drive assembly,
obtain usage context from said cache in response to said activation of said display mounted on said hard disk drive assembly, wherein the usage context comprises a rank status in a RAID configuration, the rank status including an indication of whether the rank is in one of a plurality of modes, the plurality of modes comprising a normal mode, a failed mode, a degraded mode, and a rebuilding mode; and information of an amount of free space in the cache, a microcode in the cache, hardware levels of the cache, a spin-up status of said hard disk, an operator that configured the rank, and a rotational velocity of said hard disk, and
display at least a portion of said information obtained from said cache on said display mounted on said hard disk drive assembly; and
a control coupled to said driver circuit, wherein said driver circuit is further configured to:
perform said activation by detecting said control has been engaged at a first time,
determine if said control is engaged at a second time, and in response to determining said control is not engaged, power off said display, wherein said second time is greater than a predetermined time threshold time after said first time.

9. The hard disk drive assembly of claim 8, wherein said control is one of a switch, a button, a toggle, a knob, or a lever.

10. The hard disk drive assembly of claim 9, wherein said control is a button and said button is a four-way button.

11. The hard disk drive assembly of claim 8, wherein said display is an OLED display.

12. The hard disk drive assembly of claim 9, wherein said predetermined threshold time is determined by said user.

13. The hard disk drive assembly of claim 9, wherein said driver circuit is configured to obtain information by reading data from said cache.

14. The hard disk drive assembly of claim 13, wherein said driver circuit is configured to display information comprising a message indicating said data is not available in response to determining that said cache does not contain said data.

15. A non-transitory computer-readable medium comprising a computer program product for displaying information related to a hard disk drive assembly, comprising:
computer code for activating a display mounted on the hard disk drive assembly, said computer code for activating the display comprising computer code for detecting that a control is engaged at a first time;
computer code for obtaining usage context from a cache of said hard disk drive assembly in response to said activation of said display mounted on said hard disk drive assembly, wherein the usage context comprises a rank status in a RAID configuration, the rank status including an indication of whether the rank is in one of a plurality of modes, the plurality of modes comprising a normal mode, a failed mode, a degraded mode, and a rebuilding mode; and information of an amount of free space in the cache, a microcode in the cache, hardware levels of the cache, a spin-up status of said hard disk, an operator that configured the rank, and a rotational velocity of said hard disk;
computer code for displaying on said display mounted on said hard drive assembly at least a portion of said information obtained from said display memory;
computer code for determining, at a second time, if said control is engaged; and
computer code for powering off said display in response to determining that said control is not engaged, wherein said second time is greater than a predetermined time threshold time after said first time.

16. The computer-readable medium of claim 15, wherein the computer code for detecting that said control is engaged comprises computer code for detecting engagement of one of a switch, a button, a toggle, a knob, or a lever.

17. The computer-readable medium of claim 16, wherein said control is a button and wherein the computer code for detecting that said button is engaged comprises computer code for detecting engagement of a four-way button.

18. The computer-readable medium of claim 15, wherein the computer code for activating said display comprises computer code for activating an OLED display.

19. The computer-readable medium of claim 15, wherein the computer code for displaying said information comprises computer code for reading data from said cache.

20. The computer-readable medium of claim 15, further comprising computer code for displaying a message indicating that said data is not available in response to determining that said cache does not contain said data.

* * * * *